United States Patent
Zhou et al.

(10) Patent No.: US 10,196,464 B1
(45) Date of Patent: *Feb. 5, 2019

(54) PRE-CERAMIC MONOMER FORMULATIONS FOR MAKING PRECERAMIC POLYMER WAVEGUIDES

(75) Inventors: Chaoyin Zhou, Chino, CA (US); Alan J. Jacobsen, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 941 days.

This patent is subject to a terminal disclaimer.

(21) Appl. No.: 12/506,859

(22) Filed: Jul. 21, 2009

(51) Int. Cl.
*C08F 2/50* (2006.01)
*C08F 28/02* (2006.01)

(52) U.S. Cl.
CPC ............... *C08F 2/50* (2013.01); *C08F 28/02* (2013.01)

(58) Field of Classification Search
CPC .................................... C08F 2/50; C08F 28/02
USPC ....... 522/44–48, 60, 79, 173–174, 178, 167, 522/180–186; 427/510
See application file for complete search history.

(56) References Cited

U.S. PATENT DOCUMENTS

| | | | | |
|---|---|---|---|---|
| 4,167,415 | A | * 9/1979 | Higuchi et al. | 430/286.1 |
| 4,406,826 | A | * 9/1983 | Morgan | C08G 75/045 252/502 |
| 5,132,354 | A | 7/1992 | DeLaet | |
| 5,236,967 | A | * 8/1993 | Ohkawa | C08F 299/022 522/100 |
| 6,008,296 | A | * 12/1999 | Yang et al. | 525/123 |
| 6,534,184 | B2 | 3/2003 | Knasiak et al. | |
| 6,573,020 | B1 | 6/2003 | Hanemann et al. | |
| 7,382,959 | B1 | 6/2008 | Jacobsen | |
| 8,017,193 | B1 | 9/2011 | Zhou et al. | |
| 8,906,593 | B1 | 12/2014 | Nowak et al. | |
| 2008/0194721 | A1* | 8/2008 | Arney et al. | 522/49 |
| 2009/0012202 | A1* | 1/2009 | Jacobine et al. | 522/90 |
| 2010/0029801 | A1* | 2/2010 | Moszner et al. | 522/167 |

OTHER PUBLICATIONS

Gupta et al., "A Validated UV Spectrophotometric Method for Simutaneous Estimation of Tretinoin and Benzoyl Peroxide in Bulk and Semi Solid Dosage Form", Rasayan J. Chem, vol. 2, No. 3 (2009), p. 649-654.*
Stevens, Malcolm P., Polymer Chemistry: An Introduction, Oxford, 1999, p. 172.*

(Continued)

*Primary Examiner* — Michael F Pepitone
*Assistant Examiner* — Jessica M Roswell
(74) *Attorney, Agent, or Firm* — Balzan Intellectual Property Law, PC

(57) ABSTRACT

Pre-ceramic monomer formulations for creating self-propagating polymer waveguides, and a system and method of using the same, is disclosed. The formulation includes a plurality of unsaturated molecules, wherein the unsaturated molecules contain a significant amount of non-carbon atoms, a molecule having structure of R'—X1-H (e.g., X1=O, S, N), and a photoinitiator. R' can also have non-carbon atoms. The system includes a light source, a reservoir having a monomer formulation and a patterning apparatus configured to guide a light beam from the light source into the pre-ceramic monomer formulation to form at least one self-propagating polymer waveguide and can be directly converted to interconnected three-dimensional ceramics.

19 Claims, 4 Drawing Sheets

(56) References Cited

OTHER PUBLICATIONS

Alan J. Jacobsen, Three-Dimensional Ordered Open-Cellular Structures, Filed May 10, 2007, U.S. Appl. No. 11/801,908.
Alan J. Jacobsen et al., Composite Structures With Ordered Three-Dimensional (3D) Continuous Interpenetrating Phases, Filed Jan. 11, 2008, U.S. Appl. No. 12/008,479.
Adam F. Gross et al., Ceramic Microtruss, Filed Mar. 5, 2008, U.S. Appl. No. 12/074,727.
Chaoyin Zhou et al., Monomeric Composition for Making Polymer Waveguides, Filed Aug. 6, 2008, U.S. Appl. No. 12/187,201.

* cited by examiner

PRE-CERAMIC MONOMER FORMULATIONS FOR MAKING PRECERAMIC POLYMER WAVEGUIDES

CROSS-REFERENCE TO RELATED APPLICATION(S)

This application is related to the following U.S. Patent Applications, all hereby incorporated by reference in their entireties:

Ser. No. 11/580,335, filed on Oct. 13, 2006 entitled OPTICALLY ORIENTED THREE-DIMENSIONAL POLYMER MICROSTRUCTURES, by Jacobsen, issued as U.S. Pat. No. 7,382,959 on Jun. 3, 2008;

Ser. No. 11/801,908, filed on May 10, 2007 entitled THREE-DIMENSIONAL ORDERED OPEN-CELLULAR STRUCTURES, by Alan J. Jacobsen; and William B. Barvosa-Carter;

Ser. No. 12/074,727, filed Mar. 5, 2008, entitled CERAMIC MICROTRUSS, by Adam F. Gross, Alan J. Jacobsen; and Robert Cumberland; and Ser. No. 12/187,201, filed Aug. 6, 2008, entitled MONOMERIC FORMULATION FOR MAKING POLYMER WAVEGUIDES, by Chaoyin Zhou; and Alan J. Jacobsen.

BACKGROUND

In pre-ceramic monomer formulations for the fabrication of polymer waveguides and three-dimensional interconnected structures, monomer formulations enable polymer waveguide formation and direct conversion to interconnected three-dimensional ceramics.

Currently, polymer cellular materials that are mass produced are created through various foaming processes, which all yield random (not ordered) 3D microstructures. An ordered three-dimensional (3D) microstructure is an ordered 3D structure at the micrometer or nanometer scale. Techniques do exist to create polymer materials with ordered 3D microstructures, such as stereolithography techniques; however, these techniques rely on a bottom-up, layer-by-layer approach which prohibits scalability.

A stereolithography technique provides a method to build a 3D microstructure in a layer-by-layer process. This process usually involves a platform (e.g., substrate) that is lowered into a photo-monomer bath in discrete steps. At each layer, a laser is used to scan over the area of the photo-monomer that is to be cured (i.e., polymerized) for that particular layer. Once the layer is cured, the platform is lowered by a specific amount (i.e., determined by the processing parameters and desired feature/surface resolution), and the process is repeated until the complete 3D structure is created. One example of such a stereolithography technique is disclosed in Hull et al., APPARATUS FOR PRODUCTION OF THREE-DIMENSIONAL OBJECTS BY STEREO-LITHOGRAPHY, U.S. Pat. No. 4,575,330, Mar. 11, 1986, which is incorporated by reference herein in its entirety.

Modifications to the above described stereolithography technique have been developed to improve the resolution by using laser optics and special resin formulations, as well as modifications to decrease the fabrication time of the 3D structure by using a dynamic pattern generator to cure an entire layer at once. One example of such a modification is disclosed in Bertsch et al., "Microstereolithography: A Review," Materials Research Society Symposium Proceedings, Vol. 758, 2003, which is incorporated by reference herein in its entirety. A fairly recent advancement to the standard stereolithography technique includes a two-photon polymerization process as disclosed in Sun et al., "Two-Photon Polymerization And 3D Lithographic Microfabrication," APS, Vol. 170, 2004, which is incorporated by reference herein in its entirety. However, this advance process still relies on a complicated and time consuming layer-by-layer approach.

3D ordered polymer cellular structures have also been created using optical interference pattern techniques, also called holographic lithography; however, structures made using these techniques have an ordered structure at the nanometer scale and the structures are limited to the possible interference patterns, as described in Campbell et al., "Fabrication Of Photonic Crystals For The Visible Spectrum By Holographic Lithography," NATURE, Vol. 404, Mar. 2, 2000, which is incorporated by reference herein in its entirety.

Previous works have also been done on creating polymer optical waveguides. A polymer optical waveguide can be formed in certain photopolymers that undergo a refractive index change during the polymerization process. When a monomer that is photo-sensitive is exposed to light (e.g., UV light) under the right conditions, the initial area of polymerization, such as a small circular area, will "trap" the light and guide it to the tip of the polymerized region due to the index of refraction change, further advancing that polymerized region. If the polymer is sufficiently transparent to the wavelength of light used to initiate polymerization, this process will continue, leading to the formation of a waveguide structure, or fiber, with approximately the same cross-sectional dimensions along its entire length. This phenomenon has been suggested for applications such as fiber optic interconnects. The existing techniques to create polymer optical waveguides have only allowed one or a few waveguides to be formed, and these techniques have not been used to create a self-supporting three-dimensional structure by patterning polymer optical waveguides.

Recently, there has been interest in using inorganic polymer materials, such as pre-ceramic polymers to form ceramic micro-truss structures. Advantages of ceramic micro-truss materials includes high temperature stability and attractive strength to weight ratios. The importance of these high temperature ceramic micro-truss structures makes these structures amenable to a wide variety of applications, such as the automotive and aerospace industries. These ceramic micro-truss materials could be used for lightweight, high temperature structural applications or for other applications that can utilize the unique porosity, such as thermal ground planes.

Typically, these pre-ceramic polymers generally contain silicon (Si) in the molecular backbone and can be converted to a ceramic material. There are a wide variety of known pre-ceramic polymers. Examples include Starfire RD-633, Starfire SMP-10, Starfire SOC-A35, Clariant/KiON Ceraset 20 (polysilazanes), polycarbosilanes, silicone resins, polysilanes, polyvinylborazine, polyborazylene, borasine-modified hydridopolysilazanes and decaborane based polymers. These pre-ceramic polymers have been used to form specific polymer-based structures that can be subsequently heat treated (pyrolyzed/sintered) to create near net shape ceramic structures.

Other ceramic micro-truss structures have been made using the original polymer micro-truss structure (or a carbon/graphite micro-truss structure that originates from the original micro-truss structure) as a template. Typically, these techniques rely on gas-phase or dip coating processes to create a ceramic micro-truss structure.

Therefore, while these aforementioned ceramic structures can be useful, they are often disadvantageously time consuming to make, using pyrolysis, sintering, gas-phase or dip coating processes, which can often require additional steps. Also, ceramic structures, such as foams, are not ordered microstructures and can suffer from random interconnections in their forms, thereby reducing the strength of the materials.

Thus, there exists a need for creating lower cost ceramic micro-truss structures with pre-ceramic monomer and polymers, which allow direct conversion to a ceramic micro-truss without the need of any additive materials. Further, it would be advantageous to provide monomer and polymer formulations that would enable polymer waveguide formation and direct conversion to these interconnected three-dimensional ceramics. Accordingly, it would be advantageous to provide pre-ceramic monomer and polymer formulations that can be used to create polymer waveguides and interconnected three-dimensional ceramic structures that are lightweight, highly durable, hard materials, and can withstand a high temperature oxidizing environment.

SUMMARY

In one embodiment, a system and a method of using various pre-ceramic monomer formulations for fabricating self-propagating polymer waveguides by photopolymerization and can be directly converted to interconnected three-dimensional ceramics.

According to an embodiment of the present invention, a pre-ceramic monomer formulation for the fabrication of self-propagating pre-ceramic polymer waveguides by photopolymerization is provided. The pre-ceramic monomer formulation includes: a plurality of unsaturated molecules, wherein the unsaturated molecules further includes at least one or more non-carbon atoms; a molecule having a structure of R'—X1-H, (e.g., X1=O, S, and N); and a photoinitiator.

According to another embodiment of the present invention, a system for at least one self-propagating polymer waveguide by photopolymerization is provided. The system includes, a collimated light source for producing a light beam; a reservoir having a pre-ceramic monomer formulation adapted to polymerize under a light exposure generated by the light beam; and a patterning apparatus configured to guide a portion of the light beam into the pre-ceramic monomer formulation to form at least one polymer waveguide through a portion of a volume of the monomer formulation. The pre-ceramic monomer formulation includes, a plurality of unsaturated molecules, wherein the unsaturated molecules further comprises at least one or more non-carbon atoms; a molecule having a structure of R'—X1-H, (e.g., X1=O, S, and N); and a photoinitiator.

In yet another embodiment of the present invention, a method for forming at least one polymer waveguide is provided. The method includes, forming a volume of pre-ceramic monomer formulation; securing a mask having at least one aperture between a collimated light source and the volume of the pre-ceramic monomer formulation; and directing a collimated light beam from the collimated light source to the mask for a period of exposure time so that a portion of the collimated beam passes through the mask and is guided by the at least one aperture into the volume of the pre-ceramic monomer formulation to form at least one waveguide through a portion of the volume of the pre-ceramic monomer formulation. The pre-ceramic monomer formulation includes a plurality of unsaturated molecules, wherein the unsaturated molecules further includes at least one or more non-carbon atoms; a molecule having a structure of R'—X1-H, (e.g., X1=O, S, and N); and a photoinitiator;

According to an embodiment of the present invention, the non-carbon atoms of the unsaturated molecules can be Si, B, Al, Ti, Zn, O, N, P, S and Ge.

According to several embodiments, each of the unsaturated molecules can include C=X2 double bonds or C≡X2 triple bonds, wherein X2 can be C, N, O, or S. The C=X2 double bonds or C≡X2 triple bonds can be located at terminal positions of a corresponding one of the unsaturated molecules.

The unsaturated molecules may be from about 3% and about 97% by weight of the monomer formulation.

Preferably, each of the unsaturated molecules can include at least one double bond or triple bond.

In an embodiment of the present invention, the unsaturated molecules can be selected from the group consisting of ethynyl, cyanide, vinyl ether, vinyl ester, vinyl amides, vinyl triazine, vinyl isocyanurate, acrylate, methacrylate, diene, triene, C=X2 double bonds, or C≡X2 triple bonds, and mixtures thereof.

In an embodiment of the present invention, some examples of the unsaturated molecules can be trivinylborazine; pentaerythritol tetraacrylate; 2,4,6-triallyloxy-1,3,5-triazine; triallyl-1,3,5-triazine-2,4,6-trione; tricyclohexane; 2,4,6-trimethyl-2,4,6-trivinylcyclotrisilazane; 1,3,5,7-tetravinyl-1,3,5,7-tetramethylcyclotetrasilazane; 1,3,5-trivinyl-1,3,5-trimethylcyclosiloxane; 1,3,5,7-tetravinyl-1,3,5,7-tetramethylcyclotetrasiloxane; 2,2,4,4,6,6-hexakisallyloxyl-triazatriphosphinine; B,B'B"-trithynyl-N,N'N"-trimethylborazine; B,B'B"-triethynylborazine; pentaerythritol tetraacrylate and mixtures thereof.

The molecule having a structure of R'—X1-H can be from about 0% to about 99% by weight of the monomer formulation. The molecule having a structure of R'—X1-H (X1=O, S, and N) can include a part of an organic group. The part of an organic group can include a part of an alkyl group, ester group, thio groups, amine group, or hydroxy group.

In yet another embodiment of the present invention, the molecule having a structure R'—X1-H can include part of an inorganic group. The part of the inorganic group can include a non-carbon atom containing group. The non-carbon atom can be selected from the group consisting of Si, B, Al, Ti, Zn, O, N, P, S and Ge.

The molecule having a structure of R'—X1-H can include at least one or more X1-H groups.

In some embodiments of the present invention, the molecule having a structure of R'—X1-H can have examples such as ethandithiol; pentaerythritol tetrakis(3-mercaptopropionate); trimethylolpropanetris(2-mercaptoacetate); trimethylolpropane tris(3-mercaptopropionate); tetrakis(dimethyl-3-mercaptopropylsiloxy)silane; tetrakis(dimethyl-2-mercaptoacetate siloxy)silane; and pentaerythritol tetrakis (2-mercaptoacetate).

The photoinitiators can be from about 0% to about 10% total weight of the monomer formulation. According to the present invention, the photoinitiators can generate free radicals under a light exposure by one of intramolecular bond cleavage or intermolecular hydrogen abstraction. Preferably, the light exposure is produced from a light having a wavelength from about 200 nm to about 500 nm. The photoinitiators can be 2,2-dimethoxy-2-phenylacetophenone; 2-hydroxy-2-methylpropiophenone; camphorquinone; benzophenone; benzoyl peroxide, and others.

In another aspect of the present invention, the monomer formulation can further include a free radical inhibitor. The free radical inhibitor can be selected from a group consisting of hydroquinone, methylhydroquinone, ethylhydroquinone, methoxyhydroquinone, ethoxyhydroquinone, propylhydroquinone, monomethylether hydroquinone, propoxyhydroquinone, tert-butylhydroquinone, and n-butylhydroquinone.

DESCRIPTION OF THE DRAWINGS

These and other features, aspects, and advantages of the present invention will become better understood with reference to the following description, appended claims, and accompanying drawings where:

DESCRIPTION

Figure 1:
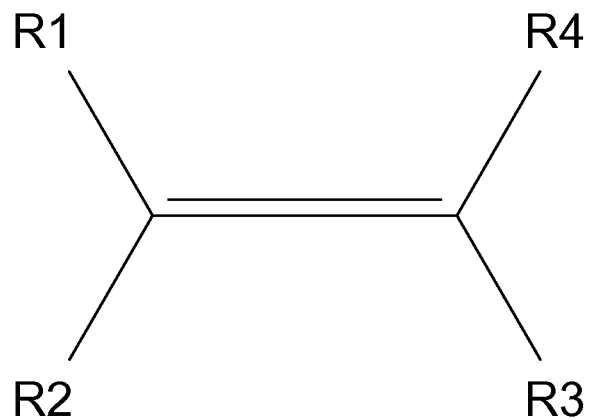
FIG. 1 illustrates an exemplary structure of an unsaturated molecule according to an embodiment of the present invention.

A series of pre-ceramic monomer formulations can be used for creating self-propagating polymer optical waveguides suitable for constructing three dimensional ceramic structures, such as an interconnected 3D pattern of self-propagating polymer optical waveguides, as described in U.S. patent application Ser. No. 11/580,335, filed on Oct. 13, 2006, issued as U.S. Pat. No. 7,382,959 on Jun. 3, 2008; entitled OPTICALLY ORIENTED THREE-DIMENSIONAL POLYMER MICROSTRUCTURES. The entire contents of which are incorporated herein by reference.

It is desirable to enable direct, near net shaped conversion of a polymer micro-truss structure formed from an interconnected pattern of self-propagating polymer waveguides to a ceramic micro-truss structure. Creating a micro-truss structure with the pre-ceramic monomer formulations formed from this application, allows direct conversion to a ceramic micro-truss without the need of any additive material. Direct conversion, by using a simple heat treatment greatly reduces the time and cost of creating ceramic micro-truss structures in comparison to other proposed techniques.

Photopolymers undergo a refractive index change during the polymerization process that can lead to the formation of polymer optical waveguides. If a monomer that is photosensitive is exposed to light (e.g., UV light) under the right conditions, the initial area of polymerization (e.g., a small circular area) will "trap" the light and guide it to the tip of the polymerized region, further advancing that polymerized region. This process will continue, leading to the formation of a waveguide structure with approximately the same cross-sectional dimensions along its entire length. This phenomenon may be applied to form interconnected pattern of self-propagating polymer waveguides as disclosed in the U.S. Pat. No. 7,382,959.

The formation of a polymer waveguide requires an index of refraction change between the liquid monomer and the solid polymer. To enable self-propagation of the polymer waveguide, the polymer must be as transparent as possible to the wavelength(s) of the light that will be used to generate free radicals and induce polymerization. In addition to these requirements, the polymerization of waveguides to form a three-dimensional open-cellular polymer structure requires a reactivity such that the reaction will stop when the light exposure is off to avoid over-curing of the monomer that surrounds the polymer waveguide.

Embodiments of the present invention may provide pre-ceramic monomer formulations for the fabrication of self-propagating pre-ceramic polymer waveguides by photopolymerization, suitable for the construction of three dimensional open-cellular polymer structures (ceramic structures). An exemplary polymeric system according to an embodiment of the present invention contains at least three chemical components: (a) a plurality of unsaturated molecules, wherein the unsaturated molecules further comprises at least one or more non-carbon atoms; (b) molecules having a structure of R'—X1-H (e.g., X1=O, S, or N) with about 3-97% weight; and (c) photo-initiators from about 0% to about 10% of total weight of the monomer formulation.

Regarding component (a), the unsaturated molecules can contain multiple bonds; C=X2 double bonds or C≡X2 triple bonds (e.g., X2=C, N, O, or S). In one embodiment of the present invention, substitution on the multiple bonds can be any atoms such as H, F and Cl, or groups such as alkyl groups, esters, amine groups, hydroxyl groups and CN. In an embodiment of the present invention, one or more of these double bonds or triple bonds can be present in the unsaturated molecules. In yet another embodiment of the present invention, the multiple bonds can contain different combination of these different multiple bonds. Of these different multiple bonds, the most common ones are the C=C double bonds at the terminal position (e.g., three substitutions on the C=C bonds are hydrogen atoms).

In several embodiments of the present invention, the unsaturated molecules contain significant amount of non-carbon atoms. In various embodiments, they contain at least one non-carbon atom. Examples of non-carbon atoms that can be used according to those skilled in the art are Si, B, Al, Ti, Zn, O, N, P, S, and Ge. In some embodiments, the unsaturated molecules contain at least one of the groups consisting exclusively of at least one of the group of Si, B, Al, Ti, Zn, O, N, P, S, and Ge. The non-carbon atoms can be a part of cyclic or acyclic structures.

FIG. 1 shows an exemplary structure of an unsaturated molecule. R1, R2, R3 and R4 can be any atoms or groups. R1, R2, R3, and R4 can be identical or different and can be any atoms such as H, F, Cl, or groups or includes substituted or unsubstituted groups such as alkyl groups, esters, amine groups, hydroxyl groups, cyanide and mixtures thereof. Preferably, the groups are selected from the group consisting of ethynyl, cyanide, vinyl ether, vinyl ester, vinyl amides, vinyl triazine, vinyl isocyanurate, acrylate, methacrylate, diene, triene, C=X2 double bonds, or C≡X2 triple bonds, and mixtures thereof.

Any structure containing carbon-carbon double bonds can participate in the photopolymerization process. In some embodiments, the vinyl groups are located at the terminal positions (i.e., three substitutions of R1, R2, R3 and R4 are hydrogen atoms). Different structures exhibit different reaction rates, and the presence of other functional groups in the structure such as CN, Cl, or OH also affect the reaction rate. A molecular structure may contain one or more different double or triple bonds, and one or more of these different structures can be used in the polymerization process. Since various combinations of double or triple bonds can be used in the polymerization process, polymer systems with very different physical properties can be created. Referring to FIG. 1, the unsaturated molecules should contain significant amount of non-carbon atoms. More preferably, at least one non-carbon atom. Exemplary examples of non-carbon atoms that can be used according to those skilled in the art are Si, B, Al, Ti, Zn, O, N, P, S, and Ge.

In one embodiment, regarding component (a), preferably, the unsaturated molecules can be selected from the group consisting of ethynyl, cyanide, vinyl ether, vinyl ester, vinyl amides, vinyl triazine, vinyl isocyanurate, acrylate, methacrylate, diene, triene, C=X2 double bonds, or C≡X2 triple bonds, and mixtures thereof.

In yet another embodiment of the present invention, regarding component (a), examples of suitable unsaturated molecules include, but are not limited to trivinylborazine; pentaerythritol tetraacrylate; 2,4,6-triallyloxy-1,3,5-triazine; triallyl-1,3,5-triazine-2,4,6-trione; tricyclohexane; 2,4,6-trimethyl-2,4,6-trivinylcyclotrisilazane; 1,3,5,7-tetravinyl-1,3,5,7-tetramethylcyclotetrasilazane; 1,3,5-trivinyl-1,3,5-trimethylcyclosiloxane; 1,3,5,7-tetravinyl-1,3,5,7-tetramethylcyclotetrasiloxane; 2,2,4,4,6,6-hexakisallyloxyl-triazatriphosphinine; B,B'B"-trithynyl-N,N'N"-trimethylborazine; B,B'B"-triethynylborazine; and pentaerythritol tetraacrylate and mixtures thereof.

In a preferred embodiment of the present invention, one or more of these double or triple bonds can be present in the molecules. The unsaturated molecules can also contain different combinations of these different multiple bonds.

Regarding component (a), in one of the preferred embodiments of the present invention, the unsaturated molecules are from about 3% to about 97% by weight of the monomer formulation.

Regarding component (b), in further detail, the component can have a structure of R'—X1-H, where X=O, S, N with from about 3 to about 97% by weight. The R' groups can be organic groups such as alkyl groups, esters, amines and hydroxyl, or non-carbon containing atoms or groups. Some non exclusive examples of non-carbon atoms that can be used according to those skilled in the art are Si, B, Al, Ti, Zn, O, N, P, S, and Ge. The R'—X1-H can contain one or more X1-H groups in the structure that can be used in the polymerization. The reaction rate varies depending on the different molecules utilized. The molecule having a structure of R'—X1-H may comprise at least one or more thio groups. The thio- or mercapto structures (R—SH) may be from about 0 to about 97% by weight of monomer formulation. The non-carbon atoms can be a part of cyclic or acyclic structures.

In yet another embodiment, the molecule having the structure R'—X1-H comprises a part of an inorganic group. Preferably, the part of an inorganic group comprises a non-carbon atom containing group. More preferably, the non-carbon atom is selected from the group consisting of Si, B, Al, Ti, Zn, O, N, P, S and Ge.

Regarding component (b), the molecule that may have a structure of R'—X1-H can include but are not limited to ethandithiol; pentaerythritol tetrakis(3-mercaptopropionate); trimethylolpropanetris(2-mercaptoacetate); trimethylolpropane tris(3-mercaptopropionate); tetrakis(dimethyl-3-mercaptopropylsiloxy)silane; tetrakis(dimethyl-2-mercaptoacetate siloxy)silane; and pentaerythritol tetrakis (2-mercaptoacetate).

Regarding component (c), a photo initiator can be used in the polymerization process. According to those skilled in the art, a photo initiator is typically known as any compound, which can generate free radicals under light by either intramolecular bond cleavage or intermolecular hydrogen abstraction. In yet another embodiment of the present invention, one or more different types of photoinitiators can be used in the polymerization process and can usually result in different reaction rates. The photoinitiators are typically about 0-10% by weight, in various embodiments.

Figure 2:
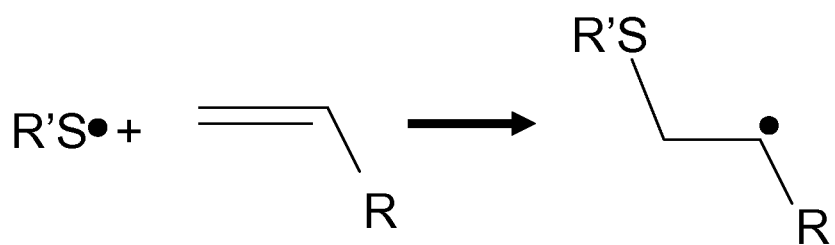
FIG. 2 illustrates exemplary free radicals generated as key intermediates during the propagation step in an exemplary polymerization process according to some embodiments of the present invention.

FIG. 2 illustrates exemplary free radicals generated as key intermediates during the propagation step in an exemplary polymerization process according to embodiments of the present invention.

In accordance with an embodiment of the present invention, in a mixture of the three components (a), (b) and (c) described above, free radicals typically are generated by the photoinitiator when exposed to the appropriate wavelength of light. As illustrated in FIG. 2, these highly reactive free radicals react with the thio-containing molecules producing thiyl radicals that are further transferred to the vinyl groups. The repeating propagation and chain transfer will continue with the generation and regeneration of free radicals in the step growth polymerization producing a well controlled polymeric system. The formation of the solid polymer will induce a change of index of refraction between the resin and produced polymer and guide the light to form a three-dimensional pattern of self-propagating polymer waveguide.

Furthermore, a component (d) can be included in the polymeric system. Component (d) is a free radical inhibitor, which can be added to the monomer mixture to help reduce unwanted polymerization of the regions outside the optical waveguide. Polymerization of the unexposed regions outside the waveguide may occur from residual heat generated from the polymerization reaction or from light that "leaks out" of the waveguide during light exposure. Exemplary materials for component (d) can be selected from one or a combination of hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone and n-butylhydroquinone. Component (d) is suitably selected to be from about 0 to about 3% by weight of the total monomer formulation.

Figure 3:
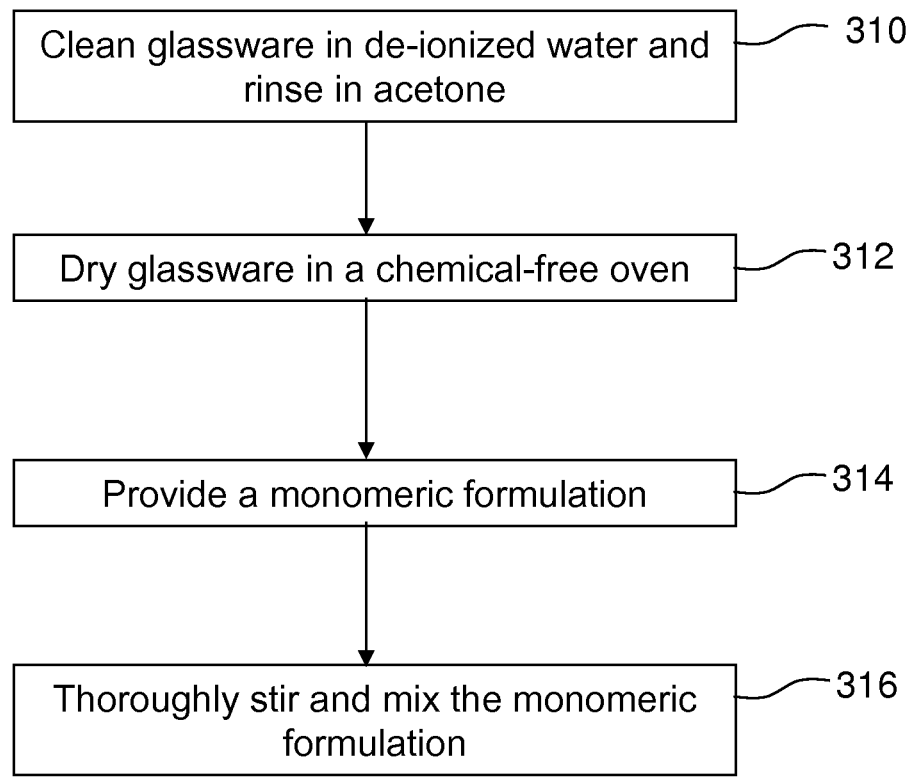
FIG. 3 is a flowchart illustrating an embodiment of an exemplary process for providing and preparing a pre-ceramic monomer formulation according to some embodiments of the present invention.

FIG. 3 is a flowchart illustrating an embodiment of an exemplary process for providing and preparing a polymeric system for polymerization according to an embodiment of the present invention.

Referring to FIG. 3, in step 310, suitable glassware (or containers with similar properties as glassware) are provided and thoroughly cleaned in de-ionized water and rinsed in acetone. Then, in step 312, the glassware are dried in a chemical-free oven at about 100° C. for at least about two hours and stored in a desiccator (or a device providing similar function) before use.

In one embodiment of the present invention, In step 314, a monomer system is provided including the following components: 100 parts of trivinylborazine, 100 parts pentaerythritol tetrakis(3-mercaptopropionate), and 1 parts 2,2-dimethoxy-2-phenylacetophenone (i.e., all parts by weight). In step 316, the components are thoroughly stirred or blended to make sure the components are well mixed, and the solution is a uniform system. In one embodiment, a monomer system of 200 grams can readily be used for polymerization after the components are well mixed or be used later after a period of time (e.g., 12-24 hours) at room temperature (e.g., 20-25° C.). For prolonged storage, the mixture can be stored in a refrigerator at a temperature around 5° C. to inhibit or prevent free-radical production.

In another embodiment, the pre-ceramic monomer formulation can use one of 2-hydroxy-2-methylpropiophenone, camphorquinone, benzophenone, or benzoyl peroxide to replace 2,2-dimethoxy-2-phenylacetophenone as the (c) photoinitiator.

In yet another embodiment of the present invention, the monomer system may use one of 2,4,6-triallyloxy-1,3,5-triazine; triallyl-1,3,5-triazine-2,4,6-trione; tricyclohexane; 2,4,6-trimethyl-2,4,6-trivinylcyclotrisilazane; 1,3,5,7-tetravinyl-1,3,5,7-tetramethylcyclotetrasilazane; 1,3,5-trivinyl-1,3,5-trimethylcyclosiloxane; 1,3,5,7-tetravinyl-1,3,5,7-tetramethylcyclotetrasiloxane; 2,2,4,4,6,6-hexakisallyloxyl-triazatriphosphinine; B,B'B''-trithynyl-N,N'N''-trimethylborazine; B,B'B''-triethynylborazine; or pentaerythritol tetraacrylate to replace trivinylborazine as the (a) unsaturated molecule. A person with ordinary skill in the art should appreciate that the amount used for each of the individual monomers may be changed depending on their molecular weights.

In yet still a further embodiment of the present invention, the monomer system may use ethandithiol; pentaerythritol tetrakis(3-mercaptopropionate); trimethylolpropanetris(2-mercaptoacetate); trimethylolpropane tris(3-mercaptopropionate); tetrakis(dimethyl-3-mercaptopropylsiloxy)silane; and tetrakis(dimethyl-2-mercaptoacetate siloxy)silane; to replace pentaerythritol tetrakis(2-mercaptoacetate) as the (b) containing component.

In yet another embodiment of the present invention, it is understood that any combination of the above (a), (b), (c) can be used in accordance with the present invention. The preferred pre-ceramic monomer formulation can comprise any mixture of distinct non-carbon atoms from the unsaturated molecules of (a), with a mixture of distinct non-carbon atoms from the R'X1-H molecule of (b).

Figure 4:
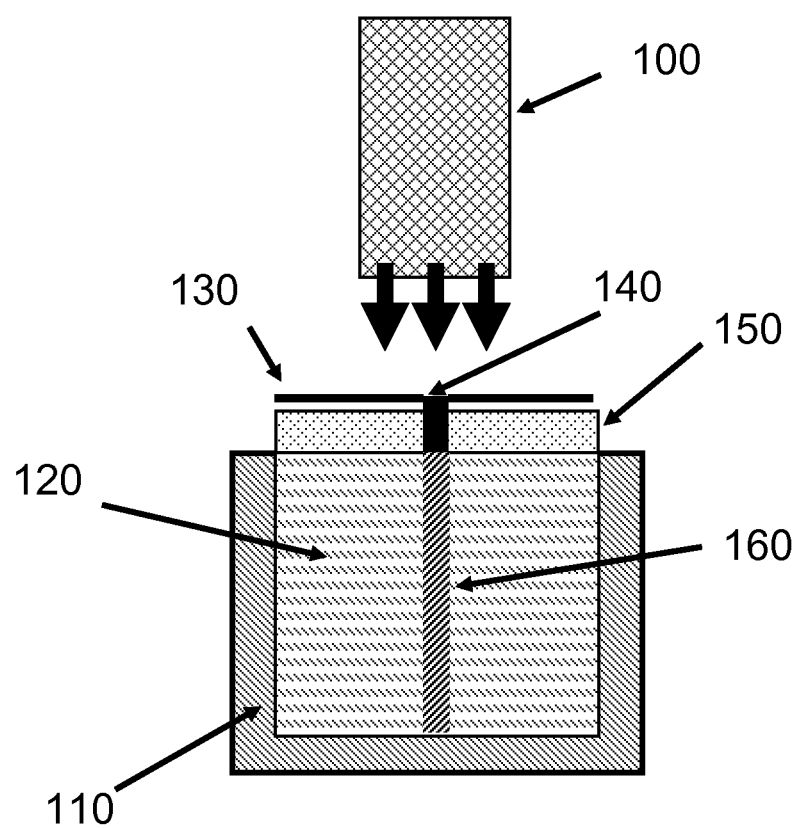
FIG. 4 illustrates a system for forming a single optical polymer waveguide according to an embodiment of the present invention.

FIG. 4 illustrates a system for forming at least one self-propagating polymer waveguide by photopolymerization according to an embodiment of the invention. Preferably, the system includes a collimated light source for producing a light beam 400; a reservoir (e.g., a mold) 410 having a volume of pre-ceramic monomer formulation 420, adapted to polymerize under a light exposure generated by the light beam 100; and a patterning apparatus (e.g., mask) 430 with a single aperture 440 (e.g., open area) of a suitable shape and dimension. For example, the aperture 440 can be in a shape of a triangle, a pentagon, a hexagon, a polygon, an oval a start, etc. The volume of monomer 420 can be prepared, for example, according to the process illustrated in FIG. 3.

Referring to FIG. 4, a single collimated beam is directed through the aperture 440 in the patterning apparatus 430 to the monomer 420. Between patterning apparatus 430 and the monomer 420, there can be a substrate 450. The substrate can be composed of a material, such as glass, Mylar, and other suitable materials that will transmit the incident light beam to the monomer 420. That is, in one embodiment of the present invention, the substrate 450 is substantially transparent to the incident light beam. On the surface of substrate, the monomer 420 is exposed to a portion of the light beam, and an optical waveguide 160 will begin to polymerize.

The index of refraction change between the polymer and monomer will "trap" and "focus" the light in the polymer and guide the polymerization process. Due to this self-guiding/self-focusing effect, the polymerized waveguide 460 will form with an approximately constant cross-section and a length much greater than the cross-sectional dimensions. The direction in which this polymer waveguide 460 will grow is dependent on the direction of the incident collimated beam which in turn is dependent on the shape and dimensions of the aperture 440 in the patterning apparatus 430. The length to which the polymer waveguide 460 can "grow" is dependent on a number of parameters including the size, intensity, and exposure time of the incident beam, as well as the light absorption/transmission properties of the photopolymer. The time in which it takes to form a polymer waveguide typically depends on the kinetics of the polymerization process.

Figure 5:
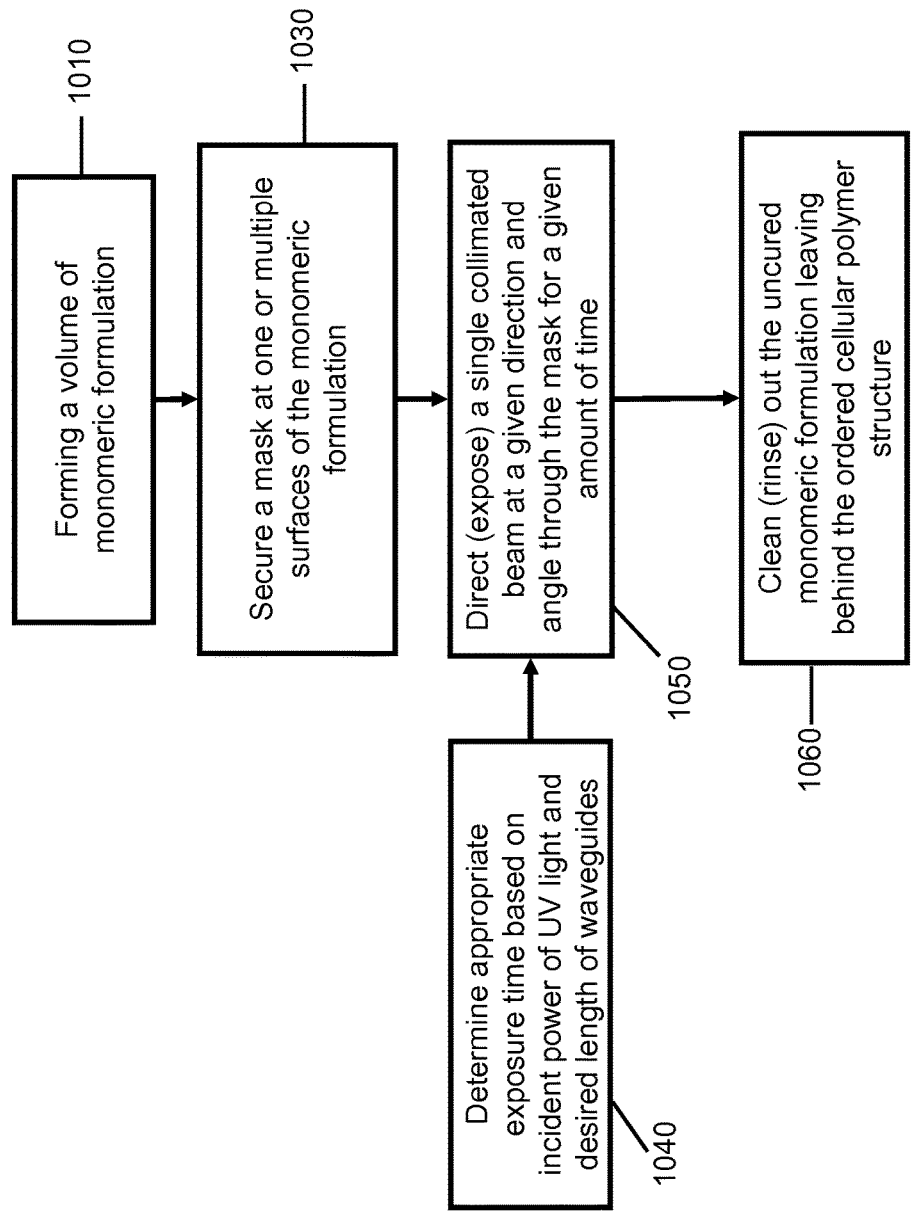
FIG. 5 illustrates a method of forming a polymer waveguide according to an embodiment of the present invention.

FIG. 5 shows a method of forming a polymer waveguide according to an embodiment of the present invention. A pre-ceramic monomer formulation can be prepared, for example according to the process illustrate in FIG. 3. In block 510, a volume of the pre-ceramic monomer formulation is secured (e.g., in a reservoir). A patterning apparatus, such as a mask having a designed geometry, is secured in block 530. Here, the secured mask has at least one aperture between at least one collimated light source and the volume of the selected photo-monomer formulation. In addition, the mask can be in contact with the photo-monomer formulation or separated by a substrate (e.g., by a UV transparent substrate).

In block 540, an appropriate exposure time can be determined based on incident power of a collimated light beam from the at least one collimated light source (e.g., an incident power of an UV light) and a desired length of one or more waveguides. The collimated light beam from the at least one collimated light source is directed to the mask for a period of exposure time so that a portion of the collimated beam passes through the ask and is guided by the at least one aperture into the photo-monomer formulation to form at least one waveguide through a portion of the volume of the photo-monomeric formulation. Here, the at least one waveguide has a cross-sectional geometry substantially matching the designed aperture geometry on the mask.

As shown in block 550, a single collimated beam at a given direction and angle is directed through the mask for a given amount of time. Then, at block 560, any uncured photo-monomer formulation is removed to leave behind a polymer waveguide.

The present invention will be illustrated by reference to the following examples. However, the examples are only for illustration purpose without limiting the scope of the present invention.

EXAMPLES

In order to demonstrate the preparation of the pre-ceramic monomer formulations of the present invention, the following experiments were performed:

All glasswares were thoroughly cleaned in de-ionized water, rinsed in acetone, and dried in a chemical free oven at 100° C. for at least two hours, and stored in a dessicator before use.

Example 1

A monomer system containing 100 parts of trivinyl borazine, 100 parts of pentaerthritol tetrakis(3-mercaptopropionate), and 1 parts of 2,2-dimethyl-2-phenylacetophenone (all parts by weight) is thoroughly stirred or blended to make sure the components are well mixed and the solution is a uniform system. Typically, a mixture of 200 grams can be readily used after being stirred overnight at room temperature. For prolonged storage, the mixture should be stored in a refrigerator with a temperature around 5° C. to inhibit free radical production.

Examples 2 Through 5

The system described in Example 1, except 2-hydroxy-2-methylpropiophenone (2), camphorquinone(3), benzophenone(4), or benzoyl peroxide (5) is used to replace 2,2-dimethoxy-2-phenylacetophenone as the photoinitiator.

Examples 6 Through 15

The system described in Example 1 except 2,4,6-triallyloxy-1,3,5-triazine (6), triallyl-1,3,5-triazine-2,4,6-trione (7), or tricyclohexane (8), 2,4,6-trimethyl-2,4,6-trivinylcyclotrisilazane (9), 1,3,5,7-tetravinyl-1,3,5,7-tetramethylcyclotetrasilazane (10), 1,3,5-trivinyl-1,3,5-trimethylcyclosiloxane (11), 1,3,5,7-tetravinyl-1,3,5,7-tetramethylcyclotetrasiloxane (12), 2,2,4,4,6,6-hexakisallyloxyl-triazatriphosphinine (13), B,B'B"-trithynyl-N,N'N"-trimethylborazine (14), B,B'B"-triethynylborazine (15), or pentaerythritol tetraacrylate (16) is used to replace trivinylborazine as the vinyl monomer. The amount used for individual monomers will change depending on their molecular weights.

Examples 17-22

The system described in Example 1 except ethandithiol (17), pentaerythritol tetrakis(3-mercaptopropionate) (18), trimethylolpropanetris(2-mercaptoacetate) (19), trimethylolpropane tris(3-mercaptopropionate) (20), tetrakis(dimethyl-3-mercaptopropylsiloxy)silane (21) or tetrakis(dimethyl-2-mercaptoacetate siloxy)silane (22) is used to replace pentaerythritol tetrakis(2-mercaptoacetate) as the (b) containing component.

The various previously described embodiments have many advantages. The advantages include pre-ceramic monomer formulations that can be used to create by direct conversion, polymer waveguides and interconnected three-dimensional ceramic structures without the need of any additive materials. These pre-ceramic monomer formulations allow the formation of polymer waveguides and ceramic structures that are low cost, lightweight, and with high thermal and mechanical stability. The versatility and the applications of these pre-ceramic monomer formulations make these compounds especially valuable.

The pre-ceramic structures fabricated from pre-ceramic monomer formulation can be converted into the ceramic structures by pyrolysis above 1000° C. Pyrolysis can be done for an extended period of time under various atmospheres (N2, air, CH4, etc). This pyrolysis process can produce the ceramic micro-truss structures with SiC, Si3N4, SiCN, or other compositions.

The foregoing is merely illustrative of the invention and is not intended to limit the invention to the disclosed compounds. Variations and changes, which are obvious to one skilled in the art, are intended to be within the scope and nature of the invention, which are defined in the appended claims.

What is claimed is:

1. A pre-ceramic monomer formulation for the fabrication of self-propagating pre-ceramic polymer waveguides by photopolymerization comprising:
a first molecule comprising at least one C=X2 double bond or C≡X2 triple bond, wherein X2 is selected from the group consisting of N, O, C and S, wherein the first molecule further comprises at least one non-carbon atom selected from the group consisting of N, O, Si, B, Al, Ti, Zn, P, S and Ge;
a second molecule comprising two or more SH groups;
a photoinitiator in a range of greater than 0% to less than 0.1% total weight of the monomer formulation;
wherein the monomer formulation further comprises a free radical inhibitor, wherein the free radical inhibitor is added in a sufficient amount relative to the first molecule, the second molecule, and the photoinitiator such that the monomer formulation will inhibit unwanted polymerization of regions outside an optical waveguide so as to allow formation of pre-ceramic self-propagating waveguides by photopolymerization; and
wherein the free radical inhibitor is in an amount from greater than 0% to less than or equal to 3% by weight of the monomer formulation;
wherein the first molecule comprises at least one functional group selected from the group consisting of ethynyl, cyanide, vinyl ether, vinyl ester, vinyl amides, vinyl triazine, vinyl isocyanurate, acrylate, methacrylate, diene, triene, mixtures thereof; and
wherein the first molecule is selected from the group consisting of: trivinylborazine; 2,4,6-trimethyl-2,4,6-trivinylcyclotrisilazane; 1,3,5,7-tetravinyl-1,3,5,7-tetramethylcyclotetrasilazane; 1,3,5-trivinyl-1,3,5-trimethylcyclosiloxane; 1,3,5,7-tetravinyl-1,3,5,7-tetramethylcyclotetrasiloxane; 2,2,4,4,6,6-hexakisallyloxyl-triazatriphosphinine; B,B'B"-trithynyl-N,N'N"-trimethylborazine; B,B'B"-triethynylborazine; and mixtures thereof.

2. The monomer formulation of claim 1, wherein the first molecule is in a range between 3% and 97% by weight of the monomer formulation.

3. The monomer formulation of claim 1, wherein the second molecule is in a range from greater than 0% to 97% by weight of the monomer formulation.

4. The monomer formulation of claim 1, wherein the second molecule comprises a part of an alkyl group, ester group, amine group, or hydroxy group.

5. The monomer formulation of claim 1, wherein the second molecule is selected from the group consisting of: ethandithiol; pentaerythritoltetrakis(3-mercaptopropionate); trimethylolpropanetris(2-mercaptoacetate); trimethylolpropanetris(3-mercaptopropionate); tetrakis(dimethyl-3-mercaptopropylsiloxy)silane; tetrakis(dimethyl-2-mercaptoacetate siloxy)silane; and pentaerythritoltetrakis(2-mercaptoacetate).

6. The monomer formulation of claim 1, wherein the photoinitiator generates free radicals under a light exposure by one of intramolecular bond cleavage or intermolecular hydrogen abstraction.

7. The monomer formulation of claim 6, wherein the light exposure is produced from a light having a wavelength from 200 nm to 500 nm.

8. The monomer formulation of claim 1, wherein the photoinitiator is selected from the group consisting of: 2,2-dimethoxy-2-phenylacetophenone; 2-hydroxy-2-methylpropiophenone; camphorquinone; benzophenone; and benzoyl peroxide.

9. A pre-ceramic monomer formulation for the fabrication of self-propagating polymer waveguides by photopolymerization, the pre-ceramic monomer formulation comprising:
a first molecule selected from the group consisting of: trivinylborazine; 2,4,6-trimethyl-2,4,6-trivinylcyclotrisilazane; 1,3,5,7-tetravinyl-1,3,5,7-tetramethylcyclotetrasiloxane; 2,2,4,4,6,6-hexakisallyloxyl-triazatriphosphinine; B,B'B"-trithynyl-N,N'N"-trimethylborazine, B,B'B"-triethynylborazine; and mixtures thereof, wherein the first molecule further comprises at least one non-carbon atom selected from the group consisting of Si, B, Al, Ti, Zn, P, S and Ge;
a second molecule selected from the group consisting of: ethandithiol; pentaerythritoltetrakis(3-mercaptopropionate); trimethylolpropanetris(2-mercaptoacetate); trimethylolpropanetris(3-mercaptopropionate); tetrakis(dimethyl-3-mercaptopropylsiloxy)silane; tetrakis(dimethyl-2-mercaptoacetate siloxy)silane; and pentaerythritoltetrakis(2-mercaptoacetate);
the monomer formulation further comprising a free radical inhibitor, wherein the free radical inhibitor is added in a sufficient amount to the monomer formulation to inhibit unwanted polymerization of the regions outside an optical waveguide so as to allow formation of pre-ceramic waveguides;
wherein the free radical inhibitor is selected from a group consisting of: methylhydroquinone; ethylhydroquinone; propylhydroquinone; tert-butylhydroquinone; and n-butylhydroquinone;
wherein the free radical inhibitor is in an amount from greater than 0% to less than or equal to 3% by weight of the monomer formulation;
a photoinitiator selected from the group consisting of: 2,2-dimethoxy-2-phenylacetophenone; 2-hydroxy-2-methylpropiophenone; camphorquinone; and benzophenone; and
wherein the photoinitiator in a range of greater than 0% to less than 0.1% total weight of the monomer formulation.

10. A monomer formulation of claim 9, wherein the first molecule is in a range between 3% to 97% by weight of the monomer formulation.

11. The monomer formulation of claim 9, wherein the second molecule is in a range from greater than 0% to 97% by weight of the monomer formulation.

12. The monomer formulation of claim 9, wherein the photoinitiator generates free radicals under a light exposure by one of intramolecular bond cleavage or intermolecular hydrogen abstraction.

13. The monomer formulation of claim wherein the light exposure is produced from a light having a wavelength from 200 nm to 500 nm.

14. A system for forming at least one self-propagating polymer waveguide by photopolymerization, the system comprising;
a collimated light source for producing a light beam;
a reservoir having a pre-ceramic monomer formulation adapted to polymerize under a light exposure generated by the light beam;
a patterning apparatus configured to guide a portion of the light beam into the pre-ceramic monomer formulation to form at least one polymer waveguide through a portion of a volume of the monomer formulation; and
wherein the pre-ceramic monomer formulation comprises:
  a plurality of unsaturated molecules, wherein the plurality of unsaturated molecules further comprises at least one non-carbon atom;
  a molecule having a structure of R'—X1-H, wherein X1 is selected from the group consisting of O, S, and N;
  a photoinitiator;
  wherein the plurality of unsaturated molecules comprises at least one functional group selected from the group consisting of ethynyl, cyanide, vinyl ether, vinyl ester, vinyl amides, vinyl triazine, vinyl isocyanurate, acrylate, methacrylate, diene, triene, mixtures thereof; and
  wherein the plurality of unsaturated molecules is selected from the group consisting of: trivinylborazine; 2,4,6-trimethyl-2,4,6-trivinylcyclotrisilazane; 1,3,5,7-tetravinyl-1,3,5,7-tetramethylcyclotetrasilazane; 1,3,5-trivinyl-1,3,5-trimethylcyclosiloxane; 1,3,5,7-tetravinyl-1,3,5,7-tetramethylcyclotetrasiloxane; 2,2,4,4,6,6-hexakisallyloxyl-triazatriphosphinine; B,B'B"-trithynyl-N,N'N"-trimethylborazine; B,B'B"-triethynylborazine; and mixtures thereof.

15. The system of claim 14, wherein the at least one non-carbon atom is selected from the group consisting of Si, B, Al, Ti, Zn, O, N, P, S, and Ge.

16. A method for forming at least one waveguide, the method comprising:
forming a volume of pre-ceramic monomer formulation comprising:
  a first molecule comprising at least one C=X2 double bond or C☐X2 triple bond, wherein X2 is selected from the group consisting of N, O, C and S, wherein the first molecule further comprises at least one non-carbon atom selected from the group consisting of N, O, Si, B, Al, Ti, Zn, P, S and Ge;
  a second molecule comprising two or more SH groups;
  a photoinitiator in a range of greater than 0% to less than 0.1% total weight of the monomer formulation;
  wherein the monomer formulation further comprises a free radical inhibitor, wherein the free radical inhibitor is added in a sufficient amount relative to the first molecule, the second molecule, and the photoinitiator such that the monomer formulation will inhibit unwanted polymerization of regions outside an optical waveguide so as to allow formation of pre-ceramic self-propagating waveguides by photopolymerization; and
  wherein the free radical inhibitor is in an amount from greater than greater than 0% to less than 3% by weight of the monomer formulation;
  wherein forming the volume of pre-ceramic monomer formulation includes selecting the first molecule comprising at least one functional group selected from the group consisting of ethynyl, cyanide, vinyl ether, vinyl ester, vinyl amides, vinyl triazine, vinyl isocyanurate, acrylate, methacrylate, diene, triene, and mixtures thereof; and
  wherein forming the volume of pre-ceramic monomer formulation includes selecting the first molecule from the group consisting of: trivinylborazine; 2,4,6-trimethyl-2,4,6-trivinylcyclotrisilazane; 1,3,5,7-tetravinyl-1,3,5,7-tetramethylcyclotetrasilazane; 1,3,5-trivinyl-1,3,5-trimethylcyclosiloxane; 1,3,5,7-tetravinyl-1,3,5,7-tetramethylcyclotetrasiloxane; 2,2,4,4,6,6-hexakisallyloxyl-triazatriphosphinine; B,B'B"-trithynyl-N,N'N"-trimethylborazine; B,B'B"-triethynylborazine; and mixtures thereof; and
exposing the pre-ceramic monomer formulation to a light source to form at least one polymer waveguide.

17. The method of claim 16, where exposing the pre-ceramic monomer formulation comprises:

securing a mask having at least one aperture between a collimated light source and the volume of the pre-ceramic monomer formulation; and directing a collimated light beam from the collimated light source to the mask for a period of exposure time so that a portion of the collimated beam passes through the mask and is guided by the at least one aperture into the volume of the pre-ceramic monomer formulation to form at least one waveguide through a portion of the volume of the pre-ceramic monomer formulation.

18. The method of claim 16, further comprising converting the polymer waveguide to a ceramic waveguide.

19. The monomer formulation as of claim 1, wherein the free radical inhibitor is selected from a group consisting of: methylhydroquinone; ethylhydroquinone; propylhydroquinone; tert-butylhydroquinone; and n-butylhydroquinone.

* * * * *